United States Patent [19]

Bouvet et al.

[11] 4,316,599
[45] Feb. 23, 1982

[54] SERVO-CONTROL VALVE

[75] Inventors: Jean M. Bouvet, Boulogne-Billancourt; Claude Berthou, Fontenay le Fleury; Michel Jallas, Garches, all of France

[73] Assignee: Regie Nationale des Usines Renault, Boulogne-Billancourt, France

[21] Appl. No.: 133,079

[22] Filed: Mar. 24, 1980

[30] Foreign Application Priority Data

Mar. 26, 1979 [FR] France .............................. 79 07577

[51] Int. Cl.³ .......................................... F15B 13/044
[52] U.S. Cl. ..................... 251/129; 91/433; 137/625.65; 251/50
[58] Field of Search ...................... 91/433; 137/625.65; 251/50, 129

[56] References Cited

U.S. PATENT DOCUMENTS

| | | | |
|---|---|---|---|
| 3,095,906 | 7/1963 | Kolm | 137/625.62 |
| 3,880,476 | 4/1975 | Belart et al. | 137/625.65 X |
| 3,958,495 | 5/1976 | Bernhoft | 91/433 |
| 4,071,042 | 1/1978 | Lombard et al. | 251/129 X |

Primary Examiner—Gerald A. Michalsky
Attorney, Agent, or Firm—Beveridge, DeGrandi & Kline

[57] ABSTRACT

An electromagnetically controlled hydraulic servo-control valve includes a hydraulic slide activated by an electromagnet with a plunger. The distributed pressure hydraulically pushes the slide and the plunger toward each other. Constrictions in the hydraulic conduits attenuate oscillations. The plunger and the slide have slightly different cross-sections to provide a control loop for the distributed pressure, affecting the position of the side. Use of a polarized electromagnetic supplied by a current that ranges from a negative value to a positive value doubles the regulating capacity. To prevent hysteresis of the pressure curves, as a function of the current, the electro-magnet can be supplied by a pulsed current or an alternating current with a continuous component. The servo-control valve might be used in connection with an automatic gear box control.

5 Claims, 3 Drawing Figures

SERVO-CONTROL VALVE

The present invention relates to electromagnetically-controlled hydraulic servo-control valves. By way of example, such valves might be used to provide for hydraulic distribution as well as regulation of the intake and discharge pressure of a hydraulic piston or jack. Such a valve can also be used to regulate line pressure in an automatic gear box. Such servo-valves are used in the automatic control of the clutch of automotive vehicles, as well as in the control of clutches and brakes in automatic gear boxes.

Some types of presently known servo-valves are made up of a first stage, comprising primarily a plate closing off a nozzle, and a second stage, with a hydraulic slide controlled by the first stage. In another known type of servo-valve, the movement of a hydraulic slide is controlled by electrical measurements used in placing in position electronically a slide controlled by an electro-magnet. These various prior art servo-valves are cumbersome and expensive.

The present invention overcomes these shortcomings of prior art servo-valves by providing a simple and compact device which, by means of a single slide, provides both for the distribution and the regulation of pressure, without requiring a position detector or an electronic control mechanism.

In accordance with the present invention a distribution slide is activated by an electro-magnet with a plunger, and distributed pressure is used to push the slide and the plunger toward or away from each other hydraulically, with constrictions which reduce the oscillations. By using slightly different cross-sections for the plunger and the slide, a control loop is provided, with the pressure distributed in accordance with the position of the slide. Furthermore, by using an electromagnet plunger of the polarized type, supplied with a current that can range from a negative value to a positive value, the regulating capacity is doubled. To prevent hysteresis of the pressure curves as a function of the current, the electro-magnet is supplied with a pulsed or alternating current having a continuous component.

Other special features of the invention are apparent from the following detailed specification describing one preferred embodiment of the invention, taken as an example and illustrated on the attached drawings in which.

Figure 1:
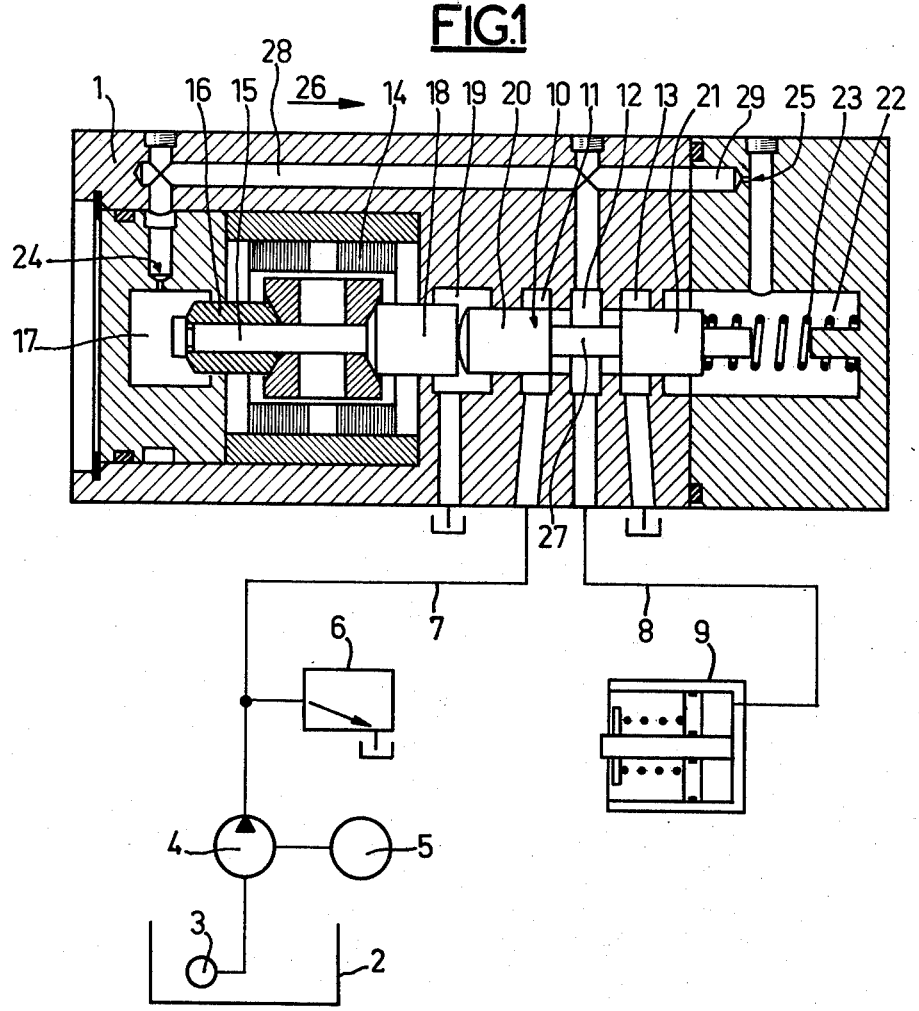
FIG. 1 is a cross-sectional view of a device according to a preferred embodiment of the present invention, including a hydraulic connection diagram.

In FIG. 1, servo-valve 1 is connected in a hydraulic circuit comprising a supply tank 2, an inlet 3, a pump 4 equipped with a motor 5, and a pressure reducer 6 on the conduit 7 which supplies the hydraulic pressure to servo-valve 1. The pressure, distributed and regulated via servo-valve 1, leaves the servo-valve through conduit 8 which supplies a jack 9. Jack 9 might, for example, control a clutch or brake.

Hydraulic slide 10 is within servo-valve 1 and is of conventional type, having a central neck 27. Slide 10 moves between three ring-shaped chambers 11, 12, and 13 within the servo-valve block. Chamber 11 is coupled to the pressure intake conduit 7. Chamber 12 is connected to the distribution conduit 8 leading to jack 9. Chamber 13 is connected to a discharge returning to supply tank 2.

An electromagnet assembly is also provided within servo-valve 1, including a winding 14 and a moveable shaft 15 whose axis is aligned with the axis of slide 10. Plunger 16 is positioned on the end of shaft 15 extending into a chamber 17. Plunger 18 is positioned on the opposite end of shaft 15 extending into a second chamber 19. Plunger 20 on one end of slide 10 also extends into chamber 19. Plunger 21 on the second end of slide 10 extends into a third chamber 22 which contains a return spring 23, mounted on centering members extending from plunger 21 and from the housing of servo-valve 1.

Chamber 17 is connected to chamber 12 by hydraulic conduit 28. Similarly, chamber 22 is connected to chamber 12 by hydraulic conduit 29. Chamber 19 is connected to a discharge leading to supply tank 2. In this way, the hydraulic pressure acting on hydraulic slide 10 and on plunger 16 of shaft 15 has the effect of constantly pushing plungers 18 and 20 into contact with each other. A constriction 24 is positioned in hydraulic conduit 28 between ring-shaped chamber 12 and chamber 17. In a similar manner, another constriction 25 is provided in hydraulic path 29 between chamber 12 and chamber 22. All oscillatory movement of slide 10 and moveable shaft 15 is attenuated by these constrictions, with plungers 18 and 20 being in contact one against the other.

The cross-section of plungers 16 and 18 is selected to be slightly different from the cross-section of plungers 20 and 21 so that the pressure applied to chambers 17 and 22 produces a force differential in the direction of the smaller plungers. In the embodiment of FIG. 1, plungers 16 and 18 are of slightly greater cross-section than plungers 20 and 21 and so a net force is applied toward the right in FIG. 1, in the direction of arrow 26, against the bias of spring 23. When the hydraulic force exceeds the bias of spring 23, slide 10 and shaft 15 move to the right.

Figure 2:
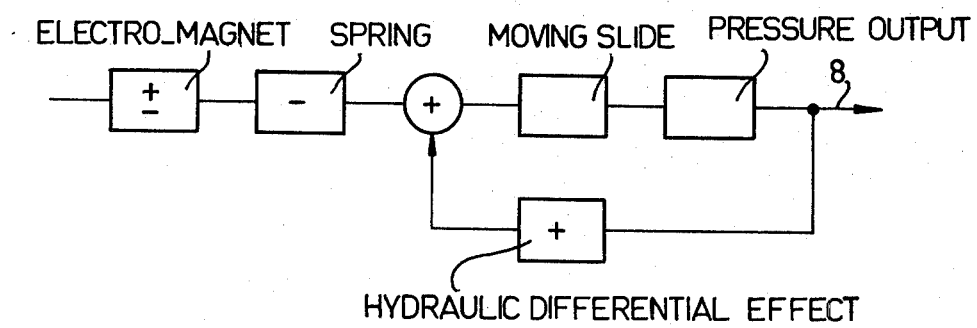
FIG. 2 is a symbolic regulation diagram.
Figure 3:
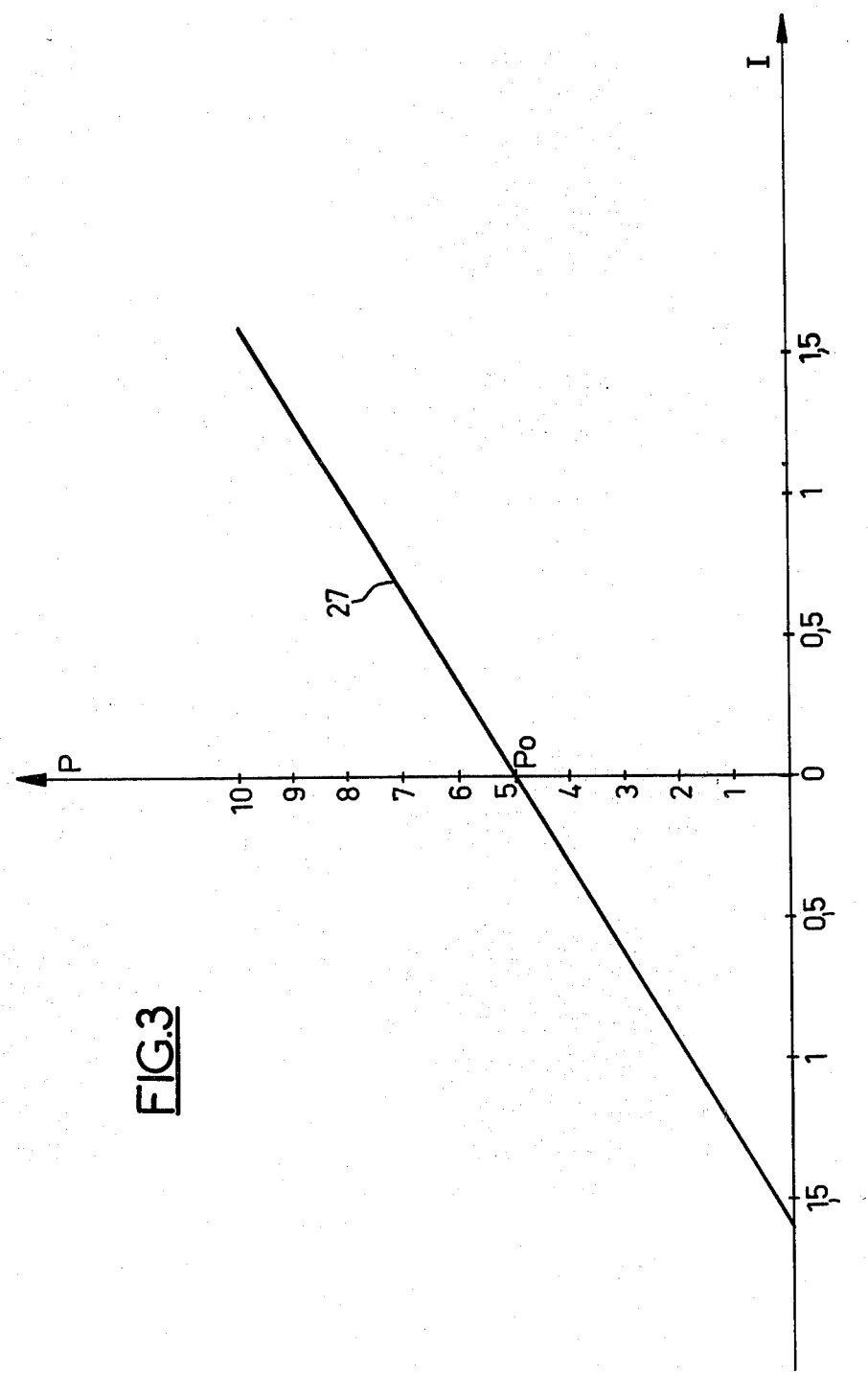
FIG. 3 is a curve of pressure regulation as a function of the current.

In this way the distribution and regulation of the pressure is achieved by means of a single slide 10, and control of the position of slide 10 is achieved without needing any position detector. The control loop is illustrated schematically in FIG. 2. If, going in the direction of arrow 26, the forces to which the movable assembly is subjected are summed, it can be seen that they can be in balance only if all of the axial forces, which act upon the assembly, are cancelled out algebraically. These forces consist of the bias of spring 23 which is negative with respect to the direction of arrow 26, the force of the electro-magnetic assembly 15, and the hydraulic differential force upon the cross-sections of plungers 16, 18, 20, and 21 which is positive and which is proportional to the pressure at conduit 8. As a matter of fact, starting with this kind of balance, any movement of the movable assembly in the positive direction, that is to say in the direction of arrow 26, produces a reduction in the pressure at conduit 8. In other words, through reduction of the differential force, there is a loss of equilibrium in the negative direction, opposing the disturbing displacement. Likewise, any displacement in the negative sense is countered by a rise of a positive return force opposing the disturbing movement. The loop thus works in terms of both regulation and control of the output pressure at conduit 8, stabilized by this control loop, and on the other hand under the direct and proportional dependence of the forces furnished by the electro-magnet 14. In particular, in the absence of excitation of electro-magnet 14, the distributed pressure at conduit 8 is not zero, but attains a value represented by Po in FIG. 3 and corresponds to the balancing of the calibration of spring 23 due to the hydraulic differential effect. With any increase in current in electro-magnet 14 there corresponds a linear increase in the pressure P along the straight line 27, shown in FIG. 3.

Finally, according to the invention, it is possible to double the regulating capacity of the mechanism by using, as electro-magnet 14, a polarized electro-magnet, such as the one described in French Pat. No. 2,311,394, as well as in the first Certificate of Addition thereto No. 2,319,184. This arrangement as a matter of fact enables covering of the remainder of the regulation straight line 27 below the point Po through inversion of the current in electro-magnet 14.

The practical regulation curve in reality has a slight hysteresis with respect to the straight line 27, primarily because of the friction to which the movable assembly 10–15 is subjected. To prevent this phenomenon and to make the regulation even more precise, electro-magnet 14 can be supplied with a chopped positive or negative direct current, or with an alternating current, superimposed on a positive or negative direct current.

Finally, the receiving member, that is to say, jack 9, with the help of the device according to the invention, receives a filling and emptying pressure modulated with precision as a function of the supply current of electro-magnet 14.

Although the present invention has been described with regard to a preferred embodiment, numerous rearrangements and changes could be made, and still the result would be within the scope of the invention.

What is claimed is:

1. A hydraulic servo-control valve comprising:
   a polarized electromagnet adapted for connection to an electric current source and having a movable shaft with a first plunger member on one end thereof and a second plunger member on the second end thereof and responsive to electric current of one polarity from the source for urging said shaft, said first plunger member and said second plunger member to move in a first direction and to electric current of opposite polarity for urging said shaft, said first plunger member and said second plunger member to move in the opposite direction;
   a slide member with a third plunger member on one end thereof and a fourth plunger member on the second end thereof, said first plunger member and said fourth plunger member being of different cross-sections; and
   means defining a housing having:
   (a) a first chamber with said first plunger member therein;
   (b) a second chamber with said second and third plunger members therein and in contact with each other;
   (c) a third chamber with said fourth plunger member therein;
   (d) said slide member aligned with said movable shaft;
   (e) spring means acting to oppose movement of said shaft and said slide members in the direction of the smaller cross-section plunger;
   (f) an inlet adapted for connection to a source of hydraulic fluid;
   (g) an outlet adapted for connection to a utilizer of pressurized hydraulic fluid; and
   (h) a plurality of conduits interconnecting said chambers, said inlet, and said outlet, for flow of hydraulic fluid therebetween, and subjecting said outlet to the hydraulic fluid pressure of said first and third chambers while substantially isolating said second chamber therefrom.

2. A hydraulic servo-control valve as claimed in claim 1 in which each of the conduits subjecting said first and third chambers to the hydrualic fluid pressure at said outlet includes constrictions tending to attenuate oscillations in the hydraulic pressure therein and thus to attenuate oscillations in the movement of said movable shaft and said slide member.

3. A hydraulic servo-control valve as claimed in claim 1 or 2 further comprising a source of chopped direct current connected to said electromagnet.

4. A hydraulic servo-control valve as claimed in claim 1 or 2 further comprising a source of current connected to provide to said electromagnet direct current having superimposed thereon an alternating current component.

5. A hydraulic servo-control valve as claimed in claim 1 or 2 in which said first plunger member is of a larger cross-section than said fourth plunger member.

* * * * *